(12) United States Patent
Khakhar

(10) Patent No.: US 8,578,700 B2
(45) Date of Patent: Nov. 12, 2013

(54) GAS TURBINE ENGINE WITH FLUID MIXING ARRANGEMENT

(75) Inventor: Satish Christoph Khakhar, Essex (GB)

(73) Assignee: Rolls-Royce PLC (GB)

( * ) Notice: Subject to any disclaimer, the term of this patent is extended or adjusted under 35 U.S.C. 154(b) by 887 days.

(21) Appl. No.: 12/650,615

(22) Filed: Dec. 31, 2009

(65) Prior Publication Data

US 2010/0180574 A1    Jul. 22, 2010

(30) Foreign Application Priority Data

Jan. 21, 2009  (GB) .................................. 0900922.6

(51) Int. Cl.
*F02K 9/82* (2006.01)
*F02C 6/08* (2006.01)

(52) U.S. Cl.
USPC ........................... 60/231; 60/785; 239/265.17

(58) Field of Classification Search
USPC ............... 60/785, 782, 231, 226.1, 262, 770; 239/265.17
See application file for complete search history.

(56) References Cited

U.S. PATENT DOCUMENTS

| | | | | |
|---|---|---|---|---|
| 3,557,830 A | * | 1/1971 | Raw ................ | 137/896 |
| 3,589,132 A | | 6/1971 | Du Pont | |
| 3,637,041 A | * | 1/1972 | Hilbig ............. | 181/219 |
| 4,165,609 A | * | 8/1979 | Rudolph .......... | 60/262 |
| 4,175,640 A | | 11/1979 | Birch et al. | |
| 4,289,450 A | | 9/1981 | Kling | |
| 4,346,860 A | | 8/1982 | Tedstone | |
| 4,463,552 A | | 8/1984 | Monhardt et al. | |
| 4,546,605 A | | 10/1985 | Mortimer et al. | |
| 4,796,424 A | | 1/1989 | Farrar et al. | |
| 5,123,240 A | | 6/1992 | Frost et al. | |
| 5,261,228 A | | 11/1993 | Shuba | |
| 5,272,868 A | | 12/1993 | Ciokajlo et al. | |
| 5,376,827 A | | 12/1994 | Hines | |
| 5,941,065 A | * | 8/1999 | Lidstone et al. ............... | 60/771 |
| 6,364,254 B1 | * | 4/2002 | May ............................. | 244/214 |
| 7,514,810 B2 | | 4/2009 | Kern et al. | |
| 7,624,581 B2 | | 12/2009 | Moniz | |
| 7,861,513 B2 | | 1/2011 | Stretton | |
| 8,024,935 B2 | | 9/2011 | Hoover et al. | |

(Continued)

FOREIGN PATENT DOCUMENTS

| | | |
|---|---|---|
| EP | 1881161 A2 | 1/2009 |
| GB | 1084857 | 9/1967 |
| WO | 2006/069434 A1 | 7/2006 |
| WO | 2006091142 A1 | 8/2006 |

*Primary Examiner* — William H Rodriguez
*Assistant Examiner* — Carlos A Rivera
(74) *Attorney, Agent, or Firm* — McCormick, Paulding & Huber LLP

(57) ABSTRACT

A gas turbine engine is disclosed which comprises a bypass duct, a core engine, and a fluid mixing arrangement. The fluid mixing arrangement is configured to mix a bypass flow of fluid and a secondary flow of fluid, the secondary flow of fluid being drawn from the core engine. The arrangement comprises a flow-duct terminating with an outlet and being arranged to direct said secondary flow through the outlet and into the bypass flow. The arrangement is characterized by the provision of a delta-shaped wing in the region of the outlet, said wing extending at least partially across the duct and being configured to generate lift from said secondary flow effective to produce at least one trailing vortex extending into said bypass flow. The fluid mixing arrangement can be used as a ventilation arrangement or as part of a bleed valve arrangement in the gas turbine engine.

21 Claims, 7 Drawing Sheets

(56) References Cited

U.S. PATENT DOCUMENTS

| | | |
|---|---|---|
| 8,250,852 B2 | 8/2012 | Porte et al. |
| 2002/0178725 A1 | 12/2002 | Dev |
| 2006/0277919 A1* | 12/2006 | Martensson et al. ............ 60/785 |
| 2008/0000233 A1 | 1/2008 | Althaus et al. |
| 2008/0016878 A1* | 1/2008 | Kirby .............................. 60/782 |
| 2008/0050218 A1 | 2/2008 | Sokhey |
| 2008/0095615 A1 | 4/2008 | Bradbrook et al. |
| 2008/0115504 A1 | 5/2008 | Martensson et al. |
| 2008/0121301 A1 | 5/2008 | Norris |
| 2010/0180573 A1* | 7/2010 | Ruston ......................... 60/226.3 |

* cited by examiner

GAS TURBINE ENGINE WITH FLUID MIXING ARRANGEMENT

CROSS REFERENCE TO RELATED APPLICATION

This application is entitled to the benefit of British Patent Application No. GB 0900922.6, filed on Jan. 21, 2009.

FIELD OF THE INVENTION

The present invention relates to a gas turbine engine. More particularly, the invention relates to a gas turbine engine provided with a fluid mixing arrangement configured to mix a bypass flow of fluid with a secondary flow of fluid drawn from the core of the engine.

BACKGROUND OF THE INVENTION

The provision of ventilation outlets in order to vent a secondary flow of fluid into a primary flow of fluid are known in a wide range of different fields. For example, it is known to provide a ventilation outlet as part of a gas turbine engine, in order to vent a stream of hot gas from the so-called "fire zone" or core of the engine into a main gas stream, such as a relatively cool bypass flow passing through a bypass duct extending around the engine shroud.

FIG. 1 illustrates a simple vent outlet of a type proposed previously. As can be seen, the vent outlet 1, which is provided at the end of a ventilation duct, is formed flush with the surface of an engine casing 2, and may comprise one or more louvers 3 extending across the outlet. The hot stream of vent gases is indicated by arrow 4, and this is directed through the vent outlet and into a relatively cool bypass flow indicated by arrow 5, and is thus ejected from the ventilation duct into the bypass flow 5. However, a problem with this arrangement is that it is not particularly effective at mixing the hot flow of vent gas with the cool bypass flow, with the result that the hot gas impinges on the downstream surface of the engine casing and other components in that region. This leads to a "hot streak" on the engine casing and can cause significant thermal damage to the structure unless it is properly protected from the heat, which can increase the weight of the engine as well as the overall cost.

Similar problems can occur with conventional bleed valve arrangements in gas turbine engines, which are usually used to improve engine operability. In use, the heated air at high pressure passes from a compressor, through a bleed valve and via a diffuser into a main gas stream, such as the relatively cool bypass flow. The bleed valve allows this bleed flow to be actively or passively managed in sympathy with the operating characteristics of the engine at any particular instant in time. The diffuser, which typically takes the form of a so-called "pepperpot", is used partly to attenuate noise produced within the bleed valve itself, but also in some arrangements to produce turbulence in the flow for the purposes of enhancing mixture of the hot bleed flow with the cool bypass flow, thereby at least partly addressing the above-mentioned problems arising from the hot gases impinging on downstream parts of the engine shroud and other components. However, pepperpot diffusers are typically relatively large and heavy components, and their use can thus be expensive.

SUMMARY OF THE INVENTION

It is an object of the present invention to provide an improved fluid mixing arrangement in a gas turbine engine.

According to the present invention, there is thus provided a gas turbine engine having a bypass duct, a core engine, and a fluid mixing arrangement configured to mix a bypass flow of fluid within the bypass duct and a secondary flow of fluid, the arrangement with a flow-duct terminating with an outlet and being arranged to direct said secondary flow from said core engine through the outlet and into the bypass flow, the arrangement being characterised by the provision of a wing of substantially delta-shaped planform in the region of the outlet, said wing extending at least partially across the duct and being configured to generate lift from said secondary flow effective to produce trailing vortices extending into said bypass flow.

As will be appreciated, the bypass flow is a flow of relatively cool air which does not pass through the core engine, whilst the secondary flow is a flow of relatively hot gas.

The wing may be configured to lie at an angle of attack relative to the secondary flow. Alternatively, or additionally, the wing can be arranged so to lie at an angle of attack relative to the bypass flow.

Advantageously, said angle of attack does not exceed the critical angle of attack of the wing.

In embodiments of the invention, the wing may be arranged so as not to project into said bypass flow. For example, the wing may be located within the duct, spaced slightly inwardly of the outlet. Alternatively, however, the wing can be located substantially at the position of the outlet, and in such an arrangement it is envisaged that the wing could be configured so as to lie at substantially zero angle of attack relative to the bypass flow.

It is preferred that the forwardmost upstream part of the wing is spaced downstream from an adjacent part of the duct or outlet such that a gap is formed therebetween. In arrangements of this configuration, it has been found that part of the bypass flow can be entrained within the secondary flow ahead of the wing via the gap, thereby allowing the aforementioned vortex to generate in such a way as to have a core region made up of fluid originating from the bypass flow, and a surrounding region made up of fluid from the secondary flow. In such an arrangement, the forwardmost part of the wing may have a "blunt" configuration comprising a squared leading edge in order to allow a relatively larger proportion of the bypass flow to become entrained in the secondary flow in this manner.

The fluid mixing arrangement may comprise a wing having a substantially free trailing edge which is spaced forwardly from an adjacent part of the duct or outlet such that a gap is formed therebetween. For example, a wing of this configuration can be mounted within the secondary flow via one or more mounting struts, or as a cut-out from the primary flow duct, connected to the sides, front or rear-part of the outlet.

Alternatively, however, it is envisaged that in some embodiments the wing may be mounted to the duct or outlet via the rearmost downstream part of the wing, in which case the wing will not have a free trailing edge, but will effectively form a projection extending forwardly (relative to the direction of the secondary flow) from the side of the duct or outlet.

The wing may either be cambered, or substantially planar in profile. Where the wing is substantially planar, it can be arranged at either a positive (i.e. "nose-up") or a negative (i.e. "nose-down") angle of attack relative to the fluid flow.

In arrangements where the wing is not planar in profile, the wing can be configured such that its angle of attack varies along the span of the wing.

The wing may be configured such that its angle of attack varies along the chord of the wing.

It is also envisaged that the precise planform of the wing can be selected so as to optimise vortex generation for the anticipated operating conditions. For example, the leading edges of the delta-planform can be substantially straight, convex, concave, or ogival.

It is envisaged that in embodiments of the invention, at least a region of the duct immediately upstream of the wing may be configured to direct the secondary flow in a direction substantially parallel to the bypass flow.

Embodiments of the invention may comprise a wing which is substantially asymmetric relative to the secondary flow.

In such an arrangement, it is envisaged that the wing may have a substantially right-triangular planform, with the hypotenuse of the triangle defining the leading edge of the wing.

The asymmetric wing can be mounted to the duct via one of its catheti.

It should be appreciated that arrangements falling within the scope of the present invention can comprise a plurality of said wings. In such arrangements, the presence of more than one wing means that a higher number of vortices can be generated.

The fluid mixing arrangement of the present invention can be applied to a ventilation arrangement in which the aforementioned flow-duct takes the form of a ventilation duct, the arrangement being configured to vent said secondary flow into said bypass flow.

The fluid mixing arrangement of the present invention can also be used as part of a bleed valve arrangement. In such an arrangement, the secondary flow represents a flow of relatively hot bleed gas directed along said flow duct from the core engine and into said bypass flow.

Said flow duct may be arranged to draw said secondary flow from a compressor forming part of said core engine. Alternatively, however, the flow duct may be arranged to draw said secondary flow from a turbine section of said core engine.

So that the invention may be more readily understood, and so that further features thereof may be appreciated, embodiments of the invention will now be described, by way of example, with reference to the accompanying drawings, in which:

DETAILED DESCRIPTION OF THE PREFERRED EMBODIMENTS

Figure 2:
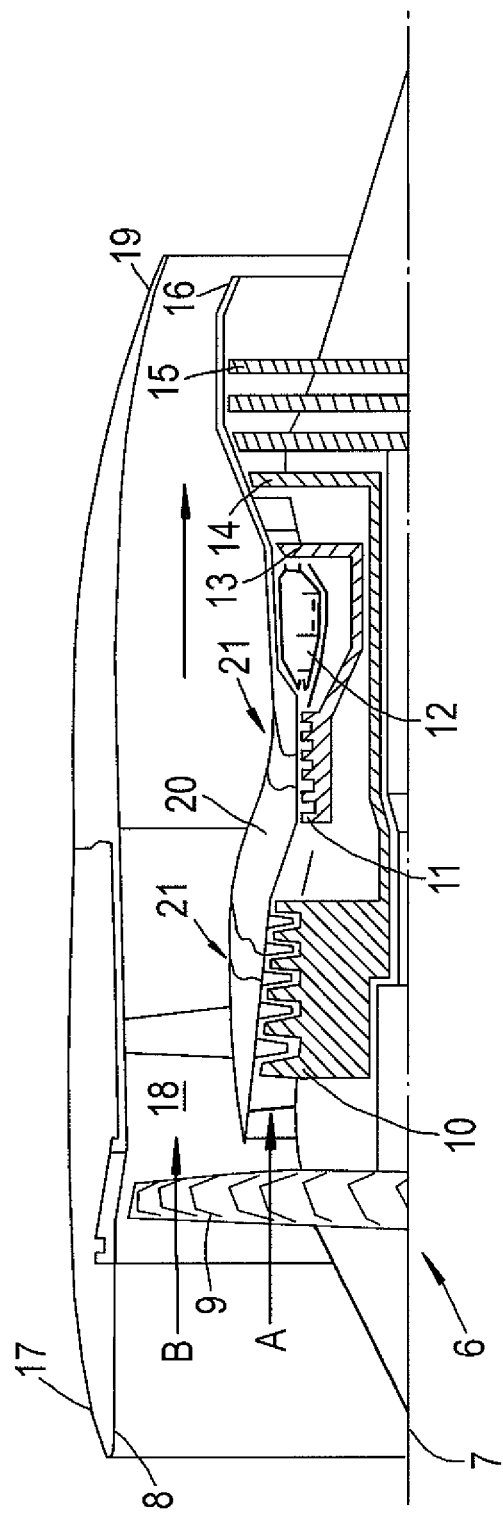
FIG. 2 is a transverse cross-sectional view through part of a gas turbine engine provided with two bleed valve arrangements.

Referring now in more detail to FIG. 2, there is shown a ducted fan gas turbine engine 6 having a principle and rotational axis 7. The engine 6 comprises, in axial flow series; an air intake 8, a propulsive fan 9, an intermediate pressure compressor 10, a high pressure compressor 11, combustion equipment 12, a high pressure turbine 13, an intermediate pressure turbine 14, a low pressure turbine 15 and a core exhaust nozzle 16. A nacelle 17 generally surrounds the engine 6 and defines the intake 8, a bypass duct 18 and an exhaust nozzle 19. As will be appreciated, the compressors 10, 11, the combustion equipment 12, and the turbines 13, 14, 15 all form part of the so-called core engine. A casing 20 generally surrounds the aforementioned components of the core engine, and defines the inner extent of the bypass duct 18.

The gas turbine engine 6 works in a generally conventional manner such that air enters the intake 8 and is accelerated by the fan 9. Two airflows are thus produced: a core airflow A which passes into the intermediate pressure compressor 10, and a bypass airflow B which passes through the bypass duct 18 to provide propulsive thrust. The intermediate pressure compressor 10 compresses the core airflow A and delivers the resulting compressed air to the high pressure compressor 11 where further compression occurs.

The resulting compressed air exhausted from the high pressure compressor 11 is directed into the combustion equipment 12 where it is mixed with fuel and the mixture ignited. The resultant hot gases then expand through, and thereby drive, the high, intermediate and low pressure turbines 13, 14, 15 before being exhausted through the core exhaust nozzle 16 to provide additional thrust. The high, intermediate, and low pressure turbines 13, 14, 15 respectively drive the high and intermediate pressure compressors 11, 10 and the fan 9 via interconnecting shafts.

During operation of the engine 6, and particularly when changing the rotational speed of the engine at low power, it is important to ensure that the pressure ratio across each compressor 10, 11 remains below a critical working point, otherwise the engine can surge, and flow through the engine breaks down, which can cause damage to the engine.

In order to maintain a desired pressure ratio across each compressor 10, 11, bleed assemblies 21 are provided to release pressure from an upstream part of the compressors 10, 11, in a manner generally known per se. As will be seen from FIG. 2, a first bleed assembly 21 is shown in fluid communication with the intermediate pressure compressor, and a second bleed assembly is shown in fluid communication with the high pressure compressor 11.

Figure 1:
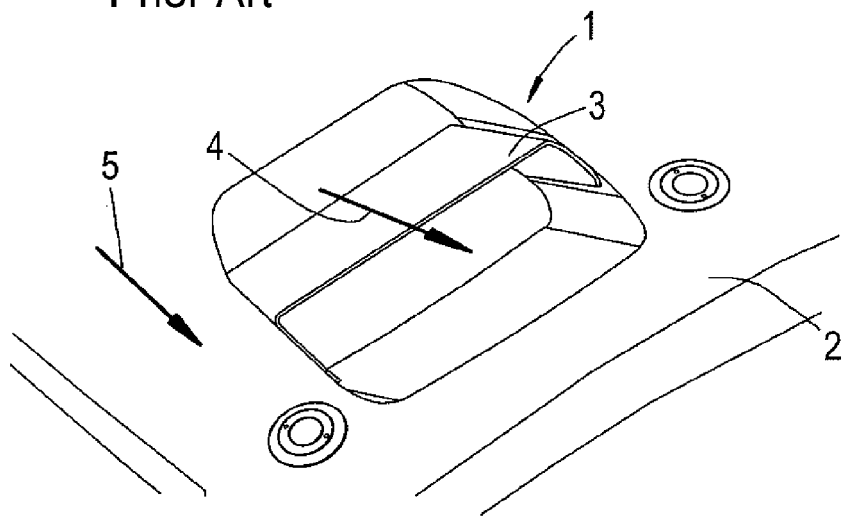
FIG. 1 is a perspective view of a prior art vent outlet.
Figure 3:
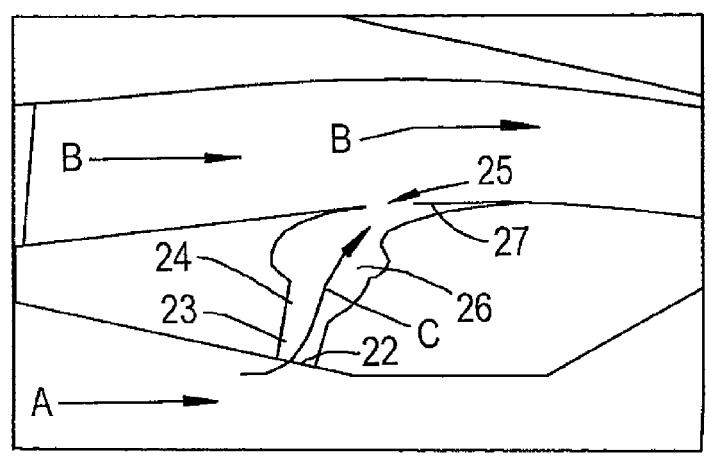
FIG. 3 is an enlarged, schematic view of one of the bleed valve arrangements shown in FIG. 2.

FIG. 3 shows a single bleed assembly 21 (the bleed assembly associated with the high pressure compressor 11) in enlarged, schematic form. The bleed assembly comprises an inlet 22, a bleed valve 23, and a bleed flow duct 24 extending from the bleed valve 23 and terminating with an outlet 25 in the form of an aperture provided in the casing 20. Part of the core airflow A may be diverted through the bleed assembly 21 as airflow C, such that airflow C enters the inlet 22, passes through the bleed valve 23 and is channelled by the duct 24 to the outlet 25 through which the hot bleed flow C is then exhausted into the bypass duct 18 where it mixes with the relatively cool bypass airflow B. There will usually be an annular array of bleed valve assemblies of this general configuration arranged around the core engine casing 20.

As illustrated in FIG. 3, the bleed assembly 21 with which the present invention may be used may include a diffuser 26, such as a pepperpot diffuser, arranged across the duct, remote from the outlet 25. The diffuser is intended to attenuate the noise produced within the bleed valve 23. However, it should be appreciated that in contrast with conventional bleed valve arrangements incorporating such diffusers, the diffuser 26 of the arrangement illustrated in FIG. 3 is not provided at the location of the outlet 25, and so its contribution to effective mixing of the bleed flow C in the bypass flow B is thus reduced. It should be noted at this juncture that although the invention is illustrated in FIG. 3 being used in conjunction with a pepperpot diffuser 26, it can also be used with other convenient forms of noise attenuation devices, such as baffle-plates or the like.

An important feature of the bleed assembly 21 illustrated in FIG. 3 is the provision of a wing 27 extending at least partially across the duct 24 in the region of the outlet 25. As will be described in more detail below, the wing 27 is arranged to generate lift from the bleed flow C so as to produce a trailing vortex extending into the bypass flow B, thereby effectively mixing the two flows. The bypass flow B can thus be considered representative of a primary flow, and the bleed flow C can be considered representative of a secondary flow to be mixed with the primary flow.

Figure 4:
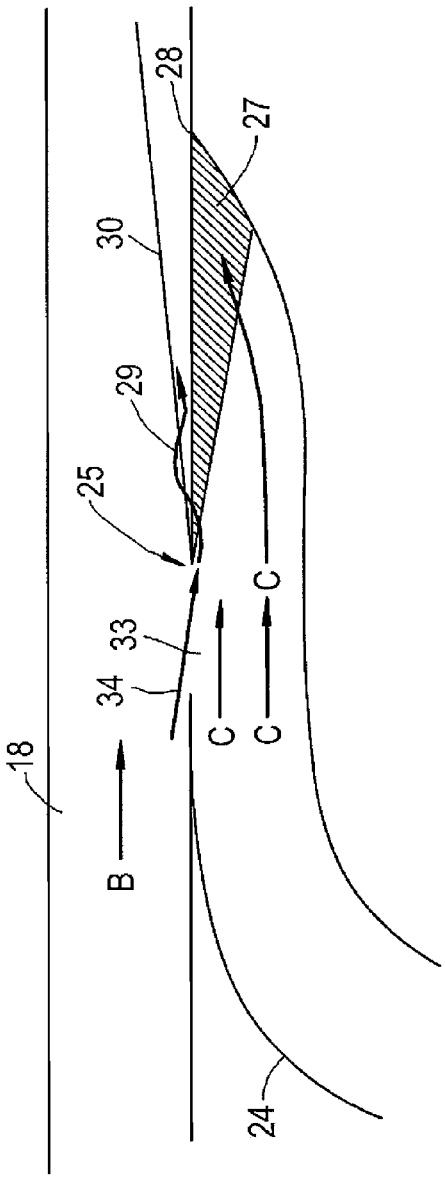
FIG. 4 is a schematic view showing a fluid mixing arrangement forming part of the bleed valve arrangement of FIG. 3, comprising a wing of delta planform.

FIG. 4 shows the downstream region of the flow-duct 24 in greater detail. In the arrangement illustrated, the region of the duct 24 immediately upstream of the wing 27 is configured so as to run generally parallel to the bypass duct 18, this arrangement thus being effective to direct the secondary flow represented by the bleed flow C in a direction substantially parallel to the primary flow represented by the bypass flow B.

Figure 5:
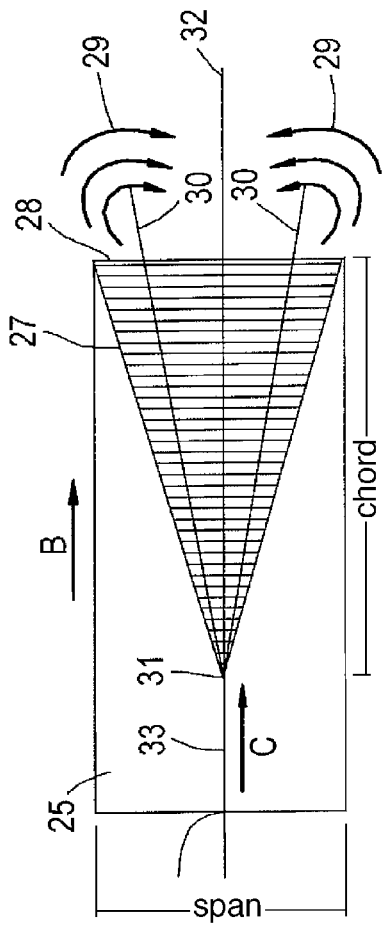
FIG. 5 is a schematic view from above, showing the plan form of the wing and the generation of trailing vortices.

As illustrated most clearly in FIG. 5, the wing 27 is configured so as to have a substantially delta-shaped planform, and so is substantially triangular in form when viewed from above as illustrated in FIG. 5, that is when viewed from a direction substantially towards the plane defined by the edges of the outlet 25. The wing 27 is therefore arranged so as to extend or span across the downstream region of the outlet 25 by differing extents at different positions along a chord of the wing. Indeed, in the particular arrangement illustrated in FIGS. 4 and 5, the wing 27 is mounted in the region of its trailing edge 28 to the side of the duct 24 within the outlet 25. The wing 27 thus effectively forms a projection extending forwardly relative to the direction of the primary flow B and the secondary flow C from the rearmost part of the duct.

The wing 27 has an aerodynamic configuration such that it generates lift from the secondary flow C. The wing 27 is arranged relative to the secondary flow C such that trailing vortices (indicated generally at 29 in FIG. 5) are shed from the wing 27 as the wing generates lift. The delta-shaped wing 27 generates two counter-rotating vortices 29 which are created so as to rotate about respective axes of rotation 30 (indicated in the phantom line in FIGS. 4 and 5), having their origin at the pointed nose 31 of the wing. As will also be evident from FIG. 5, the counter-rotating vortices 29 are spaced laterally from one another, and as shown in FIG. 4, the vortices 29 stretch into the bypass duct 18 and hence extend into the primary flow of bypass air B. The vortices 29 thus each entrain part of the primary flow B, drawing it inwardly towards the lateral centre line 32 of the wing, thus effectively maintaining a shroud of relatively cold primary stream flow around a central region of relatively hot secondary stream flow, thereby keeping the hotter gases away from the downstream surfaces and components of the engine. The vortices 29 also assist in ensuring effective mixing of the primary and secondary flows B,C.

The arrangement illustrated in FIGS. 4 and 5 is also configured so that the nose 31 of the wing, which represents the forwardmost upstream part of the wing 27, is spaced downstream from the adjacent forwardmost part of the outlet 25. A gap 33 is thus formed between the forwardmost part of the outlet 25 and the forwardmost part of the wing 27. The gap 33 allows part of the primary flow B, indicated in FIG. 4 by the arrow 34, to become entrained with the secondary flow C ahead of the wing 27. This upstream entrainment causes the vortices 29 to generate in such a way as to have a core region made up of relatively cold fluid originating from the primary flow B, surrounded by a region of fluid originating from the secondary flow C in which further fluid from the primary flow becomes entrained as the vortices 29 stretch into the primary flow. This arrangement provides rapid thermal diffusion as a result of the two fluids mixing at each of these flow interfaces within the vortices. Additionally, centrifugal mixing occurs outwardly from the relatively cool, and hence dense, cores of the vortices.

However, it should be appreciated, that even in the absence of gap 33 (for example in arrangements where the forwardmost nose of the wing is immediately adjacent or even secured to the forwardmost part of the outlet), the tapering nature of the delta-wing profile nevertheless allows part of the primary flow B to become entrained with the secondary flow C prior to passing over the surfaces of the wing. The presence of gap 33 simply serves to ensure that sufficient entrainment occurs ahead of the wing. As will be appreciated, the degree of upstream entrainment of the two flows can thus be determined by careful selection of the size of the gap 33.

As can be seen from FIG. 4, the wing 27 is arranged so as to be presented at a substantially zero angle of attack relative to the primary flow B, and does not project into the primary flow passing along the bypass duct 18. Of course, it should be appreciated that the wing 27 is presented to the secondary flow C at an angle of attack effective to generate lift and hence produce the above mentioned vortices.

Figure 6A:
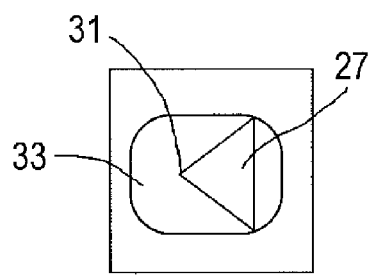
FIGS. 6a and 6b show two possible delta-shaped wing planforms.
Figure 6B:
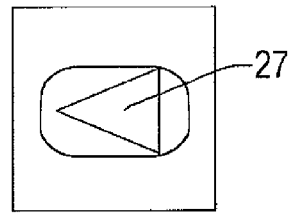

FIGS. 6a and 6b illustrate possible variations in the aspect ratio of the delta-shaped wing planform. FIG. 6a illustrates a relatively short wing 27, whilst FIG. 6b illustrates a longer wing 27 of a form similar to that described above and as shown in FIGS. 4 and 5. In the arrangement of FIG. 6a it will therefore be appreciated that the gap 33 immediately upstream of the nose 31 of the wing is larger than in the arrangement of FIG. 6b. The arrangement of FIG. 6a will thus allow the upstream entrainment of a higher volume of the primary flow B within the secondary flow C prior to generation of the vortices.

Figure 7A:
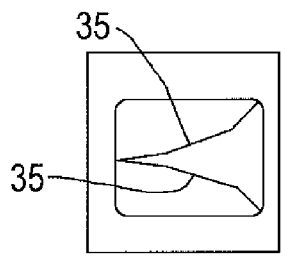
FIGS. 7a, 7b, 7c and 7d show four alternative wing planforms having substantially curved leading edges.
Figure 7B:
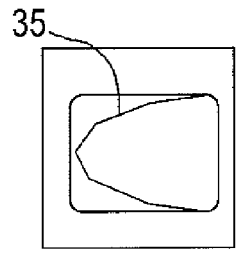
Figure 7C:
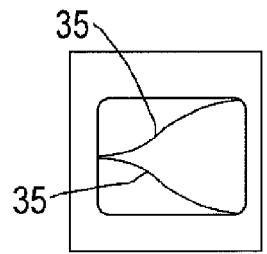
Figure 7D:
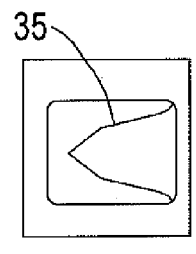

FIGS. 7a, 7b, 7c and 7d each show generally delta-shaped wing planforms falling within the scope of the present invention but which have substantially curved leading edges 35. The arrangement of FIG. 7a has substantially convex leading edges 35, the arrangement of FIG. 7b has substantially concave leading edges 35 and the arrangements of FIGS. 7c and 7d have substantially ogival leading edges 35. As will be noted, the wing shown in FIG. 7d has leading edges of opposite inflection relative to the wing shown in FIG. 7c. It should be appreciated that each of these arrangements could either be configured to have a leading edge defined by a smooth curve (as illustrated in the case of FIG. 7c), or alternatively could have leading edges defined by a series of discrete linear edge sections (as illustrated in FIGS. 7a, 7b and 7d). Each of these configurations will generate vortices having different characteristics and the precise profile of the leading edges 35 can thus be selected in order to optimise the generation of vortices for the anticipated flow conditions and operating conditions of the engine.

Figure 8A:
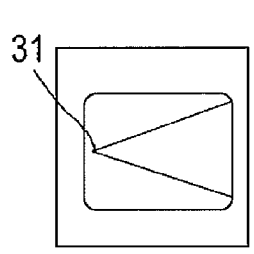
FIGS. 8a and 8b show two further possible delta-shaped wing planforms.
Figure 8B:
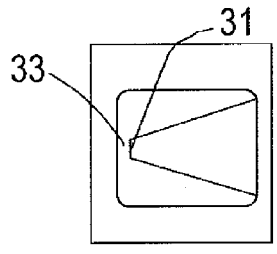

FIG. 8b shows a wing profile having a generally blunt nose 31 comprising a squared leading edge. By squaring off the nose 31 in this manner the effective area of the gap 33 ahead of the nose 31 is increased and this will allow the additional intake of entrained primary flow B within the secondary flow C ahead of the wing 31, thereby increasing the volume of primary flow B within the vortex core.

Figure 9:
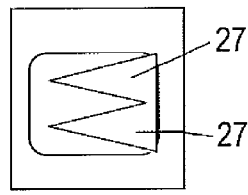
FIG. 9 shows an arrangement comprising two delta wings.

As illustrated schematically in FIG. 9, it is envisaged that in variants of the invention, the arrangement may include a plurality of wings 27 in order to generate multiple pairs of vortices. The arrangement illustrated in FIG. 9 comprises two delta wings 27 arranged in side by side relation to one another which are thus effective to generate two pairs of vortices, those vortices being smaller than the vortices generated in the arrangement of FIG. 8a, by virtue of the reduced size of each wing 27.

Figure 10A:
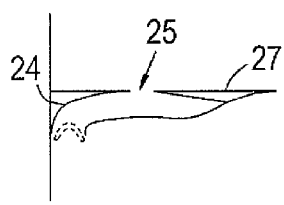
FIGS. 10a, 10b and 10c show three alternative ways in which the delta wing of the present invention can be mounted across a flow-duct.
Figure 10B:
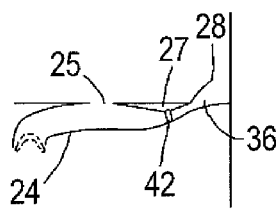

FIG. 10a illustrates a wing 27 mounted across the outlet 25 of the flow duct 24 in a generally similar manner to that described above and as illustrated in FIG. 4. In contrast, FIG. 10b illustrates an alternative mounting arrangement in which the wing 27 has been moved forwardly relative to the rear part of the outlet 25. The wing 27 is mounted on at least one mounting strut 42 which extends generally upwardly from a lower surface of the flow-duct 24. In this arrangement, the trailing edge 28 of the wing 27 is thus separated from the rearmost part of the outlet 25 and hence takes the form of a free trailing edge. A gap 36 is thus formed between the free trailing edge 28 and the rearmost part of the outlet 25.

Figure 10C:
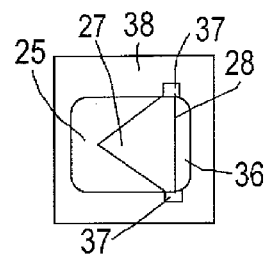

FIG. 10c illustrates another alternative mounting arrangement in which the wing 27 is mounted across the outlet 25 via a support structure 37 on each side of the wing. The support structures 37 connect the rear part of the wing to an adjacent part of the bypass duct surface 38, thereby eliminating the mounting strut of the arrangement shown in FIG. 10b. In the arrangement of FIG. 10c, it will therefore be appreciated that there is no mounting structure extending into the vent duct. However, the wing 27 can still be mounted across the outlet 25 in a manner to define a gap 36 between the trailing edge 28 and the rearmost part of the outlet 25.

Figure 11:
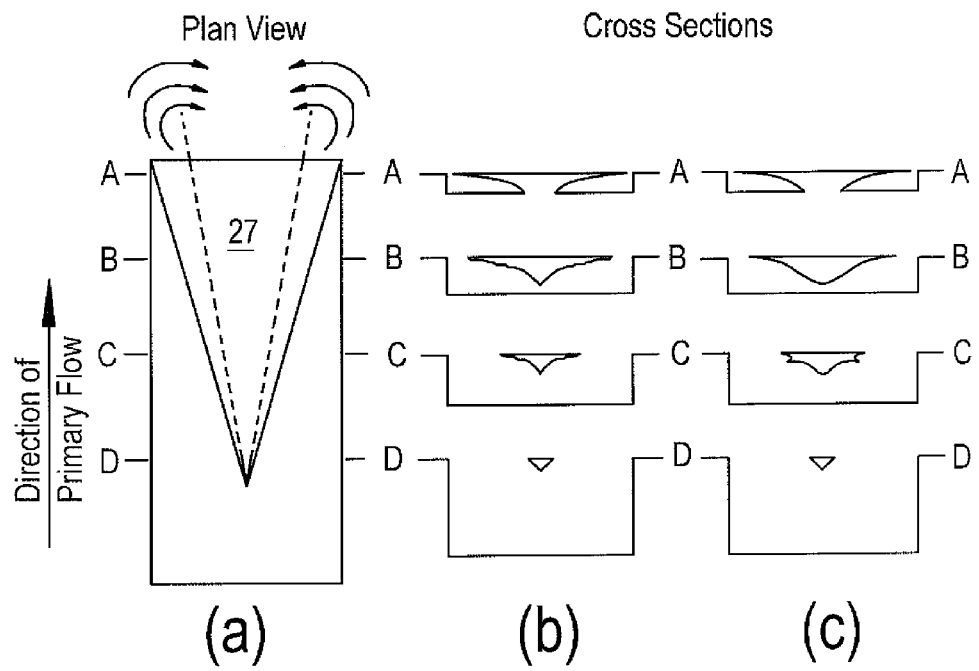
FIGS. 11a, 11b and 11c illustrate possible variations in cross-section through the delta wing.

FIGS. 11a, 11b and 11c show possible variations in the cross-sectional profile of the wing 27. FIG. 11a shows the wing 27 in plan view with four discrete section lines indicated at A-A, B-B, C-C and D-D. FIGS. 11b and 11c show possible alternative wing cross-sections at each of the aforementioned section lines. As can be seen, the wing profile illustrated in FIG. 11b is relatively simple, whereas the profile of the wing illustrated in FIG. 11c is rather more complicated, particularly in the forward region of the wing. The arrangement of FIG. 11c has been devised so as to be optimised in order to separate the entrained primary flow from the secondary flow in order to ensure optimum vortex structure for a particular application of the fluid mixing arrangement.

Figure 12:
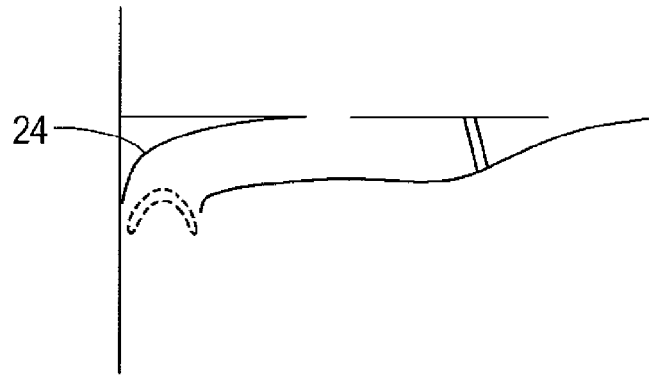
FIG. 12 shows a wing having a substantially planer profile.

FIG. 12 shows an arrangement in which the wing is substantially planar in profile. As will be appreciated, a wing of this profile is relatively simple and hence inexpensive to manufacture.

Figure 13:
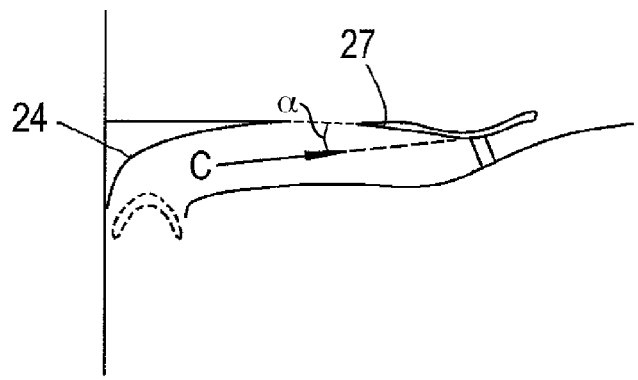
FIG. 13 is a view corresponding generally to that of FIG. 10b, illustrating a wing configured such that its angle of attack varies along the span of the wing.
Figure 14:
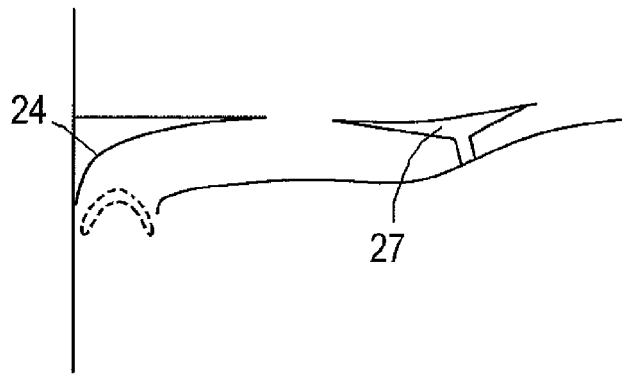
FIG. 14 is a similar view showing an alternative configuration of a wing in which the angle of attack varies along the chord of the wing.

It is envisaged that in some embodiments of the present invention, the wing 27 may be configured that so its angle of attack .alpha. relative to the secondary flow C varies along the chord of the wing as illustrated schematically in FIG. 13. This sort of variation in angle of attack .alpha. allows the optimisation of vortex generation for particular conditions and flow-duct profiles. Similarly, the wing 27 in some embodiments can be configured so that its angle of attack .alpha. varies along the span of the wing as illustrated schematically in, for example, FIG. 11 or FIG. 14.

Figure 15:
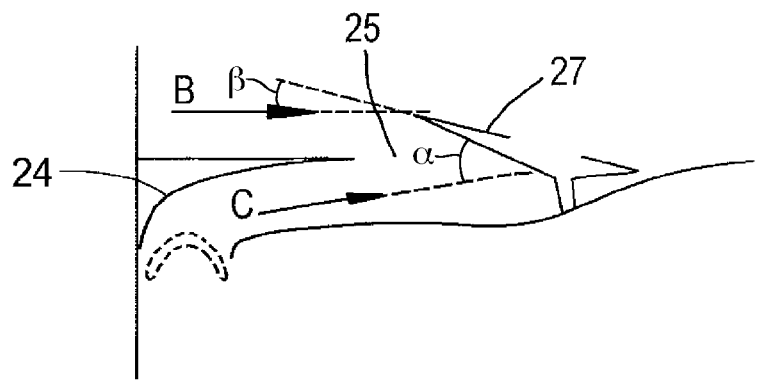
FIG. 15 is a similar view illustrating a wing arranged so as to project into a primary flow of fluid.

FIG. 15 illustrates a wing 27 mounted so as to project into the primary flow B flowing past the outlet 25. The wing 27 in this arrangement is thus presented at a positive angle of attack .beta. to the primary flow B and a positive angle of attack .alpha. to the secondary flow C. The wing of this arrangement will thus generate lift from both the secondary flow C and the primary flow B and will thus produce vortices arising from both flows, thereby providing improved mixing of the two flows, but at the expense of increased drag within the primary flow B. Each vortex produced by this arrangement will thus incorporate both primary flow B and secondary flow C, with the primary flow B forming the core of each vortex.

Figure 16:
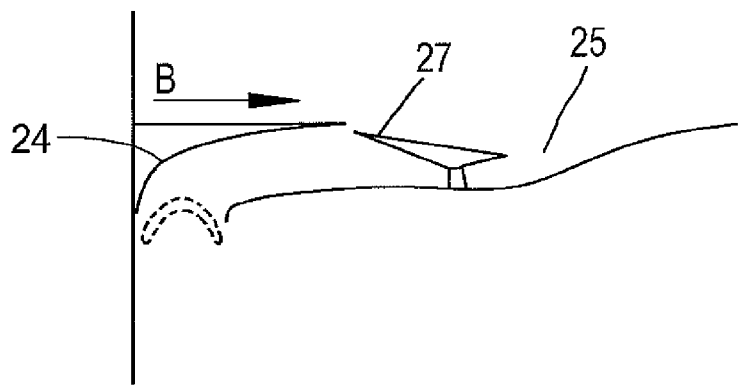
FIG. 16 is a similar view illustrating an alternative arrangement in which the wing is located within a flow-duct.

In contrast, the arrangement of FIG. 16 is configured such that the wing 27 is located inwardly of the outlet 25 so as to lie within the flow-duct 24. The wing 27 of this arrangement is thus not exposed directly to the primary flow B, although the vortices shed from the wing as a result of the lift generated from the secondary flow C still extend into the primary flow B.

It is envisaged that in some arrangements, the geometry of the or each wing 27 might be variable so as to allow active control of fluid mixing by optimising the generation of vortex to varying operating conditions of the engine, or varying flow characteristics. It is also envisaged that in some arrangements the actual position of the or each wing 27 might be variable in order to optimise vortex generation for varying operating conditions, and even allowing the wing to be moved so that no vortices are generated in certain operating conditions.

Figure 17:
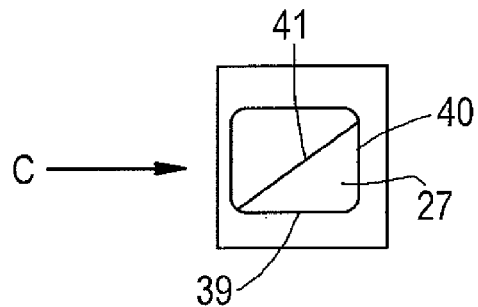
FIG. 17 is a schematic view from above, showing the plan form of an alternative form of delta wing, the wing being asymmetric.

FIG. 17 illustrates an embodiment of the present invention in which the wing 27 is substantially asymmetric in form relative to the flow direction of the secondary bleed flow C. In the arrangement illustrated, the wing has a planform in the shape of a right-triangle, and is mounted via its long cathetus 39 to one side of the duct 24 in the region of the outlet 25. The wing may optionally be mounted via its other cathetus 40 (effectively defining the trailing edge region of the wing), to the rear part of the duct outlet. As will thus be appreciated, the hypotenuse 41 of the right-triangular planform defines the leading edge of the wing and extends generally diagonally across the outlet 25.

The asymmetric wing depicted in FIG. 17, thus effectively represents one half of the type of wing illustrated, for example, in FIG. 8a. The asymmetric wing will thus generate a single vortex, rather than two vortices as in the case of the previously described arrangements.

Figure 18:
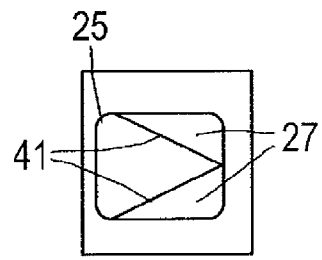
FIG. 18 is a view corresponding generally to that of FIG. 17, but illustrating an arrangement having two opposed asymmetric delta wings.

FIG. 18 illustrates an arrangement comprising two asymmetric wings 27 of the general configuration described above. As will be appreciated, the two wings are arranged in opposing relation across the outlet 25, with each wing being mounted to a respective side of the outlet. The two wings 27 are thus arranged in mirror symmetry across the outlet 25.

Each wing produces a respective single vortex in the manner described above, the two vortices counter-rotating relative to one another.

It should be appreciated, that the or each asymmetric wing could have any convenient form described above.

By using a delta-wing mixing arrangement in accordance with the present invention across the outlet to a bleed-flow duct in a gas turbine engine, instead of a conventional pepperpot configured for fluid mixing, the outlet can be reduced in size without reducing the effective vent area. This has the benefit of necessitating a smaller discontinuity in the wall bypass duct into which the bleed-flow duct vents, which is important as it means less noise attenuation material is sacrificed from the wall of the bypass duct, resulting in improved noise attenuation characteristics.

Whilst the invention has been described above with specific reference to arrangements incorporating substantially rectangular flow outlets 25, it is to be appreciated that in variants of the invention, the vent outlet 25 may have a different form, in order to optimise the profile of the outlet for a desired vortex generation, or flow characteristic.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A gas turbine engine comprising: a bypass duct, a core engine, and a fluid mixing arrangement configured to mix a bypass flow of fluid within the bypass duct and a secondary flow of fluid, the arrangement having a flow-duct terminating with an outlet and being arranged to direct said secondary flow from the core engine through the outlet and into the bypass flow, and having a wing of substantially delta-shaped planform in the region of the outlet, said wing extending at least partially across the flow-duct, spanning the flow-duct to differing extents at different portions along a chord of the wing, and being configured to generate lift from said secondary flow effective to produce trailing vortices extending into said bypass flow.

2. A gas turbine engine according to claim 1, wherein the wing is configured to lie at an angle of attack relative to the secondary flow.

3. A gas turbine engine according to claim 1, wherein the wing is configured to lie at an angle of attack relative to the bypass flow.

4. A gas turbine engine according to claim 2, wherein said angle of attack does not exceed the critical angle of attack of the wing.

5. A gas turbine engine according to claim 1, wherein the wing is arranged so as not to project into said bypass flow.

6. A gas turbine engine according to claim 1, wherein said wing is located within the duct, spaced slightly inwardly of the outlet.

7. A gas turbine engine according to claim 1, wherein the wing is configured to lie at substantially zero angle of attack relative to the bypass flow.

8. A gas turbine engine according to claim 1, wherein said wing is located substantially at the position of the outlet.

9. A gas turbine engine according to claim 1, wherein the forwardmost upstream part of the wing is spaced downstream from an adjacent part of the duct or outlet such that a gap is formed therebetween.

10. A gas turbine engine according to claim 1, wherein said wing has a substantially free trailing edge which is spaced forwardly from an adjacent part of the duct or outlet such that a gap is formed therebetween.

11. A gas turbine engine according to claim 1, wherein the wing is mounted to the duct or outlet via the rearmost downstream part of the wing.

12. A gas turbine engine according to claim 1, wherein the wing is cambered or planar in profile.

13. A gas turbine engine according to claim 1, wherein the wing is configured such that its angle of attack varies along the span of the wing.

14. A gas turbine engine according to claim 1, wherein the wing is configured such that its angle of attack varies along the chord of the wing.

15. A gas turbine engine according to claim 1 in which at least a region of the duct immediately upstream of the wing is configured to direct the secondary flow in a direction substantially parallel to the bypass flow.

16. A gas turbine engine according to claim 1, wherein the wing is substantially asymmetric relative to the secondary flow.

17. A gas turbine engine according to claim 16, wherein the wing has a substantially right-triangular planform, with the hypotenuse defining the leading edge of the wing.

18. A gas turbine engine according to claim 17, wherein the wing is mounted to the duct via one of its catheti.

19. A gas turbine engine according to claim 1 further comprising a plurality of said wings.

20. A gas turbine engine according to claim 1, wherein said flow-duct takes the form of a ventilation duct, configured to vent said secondary flow into said bypass flow.

21. A gas turbine engine according to claim 1 further comprising a bleed valve arrangement, wherein said secondary flow is a flow of bleed gas directed along said flow duct from said core engine and into said bypass flow.

* * * * *